United States Patent Office 3,391,075
Patented July 2, 1968

3,391,075
CATALYTIC CONVERSION OF HYDROCARBONS WITH THE USE OF A STEAM TREATED Y TYPE OF CRYSTALLINE ALUMINOSILICATE
Charles J. Plank, Woodbury, and Edward J. Rosinski, Almonesson, N.J., assignors to Mobil Oil Corporation, a corporation of New York
No Drawing. Continuation-in-part of application Ser. No. 202,677, June 15, 1962, which is a continuation-in-part of application Ser. No. 161,239, Dec. 21, 1961. This application Apr. 8, 1966, Ser. No. 541,142
The portion of the term of the patent subsequent to July 7, 1981, has been disclaimed
13 Claims. (Cl. 208—120)

This application is a continuation-in-part of application S.N. 202,677, filed June 15, 1962, which is in turn a continuation-in-part of S.N. 161, 239, filed Dec. 21, 1961, now abandoned.

This invention relates to the catalytic conversion of a hydrocarbon charge stock into lower normally liquid and normally gaseous products. More specifically, the invention relates to catalytic conversion of hydrocarbon oils in the presence of a catalyst consisting essentially of hydrogen Y-type crystalline aluminosilicate.

As is well known, there are numerous materials both of natural and synthetic origin which have the ability to catalyze the cracking of hydrocarbons. However, the mere ability to catalyze cracking is far from sufficient to afford a catalyst of commercial significance. Of the presently commercially available cracking catalysts, a synthetic silica-alumina gel catalyst is by far the most widely used. While such type catalyst is superior in many ways to the earlier employed clay catalysts and is fairly satisfactory, it is subject to improvement particularly in regard to its ability to afford a high yield of useful product with a concomitant small yield of undesired product.

Thus, commercial catalytic cracking has been carried out by contacting a hydrocarbon charge in the vapor or liquid state with a catalyst of the foregoing type under conditions of temperature, pressure and time to achieve substantial conversion of the charge to lower boiling hydrocarbons. The reaction which takes place is essentially a cracking to produce lighter hydrocarbons but is accomplished by a number of complex side reactions, such as aromatization, polymerization, alkylation and the like. As a result of these complex reactions, a carbonaceous deposit is laid down on the catalyst, commonly called "coke." The deposition of coke tends to seriously impair the catalytic efficiency of the catalyst for the principal reaction and the conversion reaction is thereafter suspended after coke to the extent of a few percent by weight has accumulated on the catalyst. The catalytic surface is then regenerated by burning the coke in a stream of oxidizing gas and the catalyst is returned to the conversion stage of the cycle.

As will be realized, coke and other undesired products are formed at the expense of useful products such as gasoline. It will be evident that during the period of regeneration, the catalyst is not being effectively employed for conversion purposes. It accordingly is highly desirable not only to afford a large overall conversion of the hydrocarbon charge, i.e. to provide a catalyst of high activity, but also to afford an enhanced yield of useful product such as gasoline, while maintaining undesired product such as coke at a minimum. The ability of a cracking catalyst to so control and to direct the course of conversion is referred to as selectivity. Thus, an exceedingly useful and widely sought characteristic in a cracking catalyst is high selectivity.

Another important property desirable in a cracking catalyst is steam stability, i.e., the ability not to become deactivated in the presence of steam at an excessively high rate. As a result of coke formation, it has generally been necessary to regenerate the catalyst at frequent intervals, first by stripping out entrained oil by contacting with steam and then burning off carbonaceous deposits by contacting with an oxygen-containing gas at an elevated temperature. However, it has been found that the cracking activity of the catalyst deteriorates upon repeated use and regeneration and that the silica-alumina catalysts heretofore employed are sensitive to steaming. Since steaming has been found to be the most effective way of removing entrained oil from the spent catalyst prior to thermal regeneration with air, and since steam is encountered in the seals and kiln of a commercial catalytic cracking unit, it is apparent that a catalyst characterized by good steam stability is definitely to be desired.

Conventional commercial silica-alumina amorphous gel type cracking catalysts heretofore employed possess pores in a wide variety of sizes ranging from less than about 20 Angstroms up to 200 Angstroms or more in diameter. Many of these are deadend pores. Diffusion difficulties are encountered in the very fine pores with the result that the reactant molecules of larger size, for example branched-chain hydrocarbons and aromatic components, do not have ready access to all the exposed catalytic surface area. In addition, product molecules encounter difficulty in passing from the pores of extremely small diameter and often undergo conversion to coke before release from the catalyst surface. The deposit of coke, in turn, may cover up or plug some of the porous catalyst surface requiring more frequent regeneration which adversely affects the life of the catalyst.

In the hydrocarbon conversion process of the present invention, there is employed a catalyst consisting essentially of a crystalline hydrogen Y-type aluminosilicate having a structure of rigid three-dimensional networks characterized by uniform pores between 6 and 15 Angstrom units in diameter. The uniform pore openings in such range occur in all dimensions and permit easy access to the catalyst surface of all hydrocarbon reactant molecules and afford ready release of the product molecules. There is thus provided, in accordance with the present invention, a catalytic conversion process wherein the catalyst employed is characterized by exceptional activity, selectivity and stability when employed in converting heavy petroleum hydrocarbons to lighter materials boiling in the range of gasoline.

It has heretofore been reported that various chemical reactions may be advantageously carried out by contact catalysis using as catalyst crystalline metal aluminosilicate zeolites having rigid three-dimensional networks made up of unit cells characterized by the substantial absence of change in unit cell dimensions upon dehydration and rehydration and a homogeneous highly uniform pore structure. The above requirements are fulfilled by certain crystalline zeolites known as molecular sieves. The ability of the above catalysts to influence and direct the course of chemical conversion entails an unusual degree of desirable catalytic selectivity. Briefly, two types of selectivity are involved; first, geometrical selectivity which depends on the relationship of the diameter of the pores in the crystal structure of the aluminosilicate zeolite and the diameter of the reactant and product molecules and second, intrinsic catalytic selectivity which depends on the choice of cation present on the internal surface of the crystalline aluminosilicate salt.

A wide variety of zeolites of both natural and synthetic origin are known including, for example, chabazite, gmelinite, mesolite, mordenite, natrolite, sodalite, scapolite, lazurite, leucrite and cancrinite. Synthetic zeolites may be of the A-type, X-type, Y-type or other well known forms of molecular sieve. Preparation of the above synthetic zeolites has been described in the literature, for example A-type zeolite in U.S. 2,882,243; X-type zeolite in U.S. 2,882,244 and Y-type zeolite in U.S. 3,130,007. As initially prepared, the metal of the aluminosilicate is an alkali metal and usually sodium. Such alkali metal is subject to base exchange with a wide variety of other ions. The molecular sieve materials so obtained are unusually porous, the pores having highly uniform molecular dimensions generally between about 3 and about 15 Angstrom units in diameter. Each crystal of molecular sieve material contains an exceedingly large number of tiny cavities or cages inter-connected by channels of unvarying diameter. The size and portion of the metal ions in the crystal control the effective diameter of the inter-connecting channels.

In accordance with the present invention, it has been discovered that catalytic conversion of hydrocarbons may be effectively carried out in the presence of a highly active and selective catalyst consisting essentially of a hydrogen Y-type crystalline aluminosilicate. The latter aluminosilicate is obtained by substantial replacement of the alkali metal ions of an alkali metal crystalline Y-type aluminosilicate with ions of hydrogen. Replacement of the alkali metal ions with hydrogen may be effected by contacting the alkali metal Y-type crystalline aluminosilicate with a fluid hydrogen ion-containing medium under conditions such that the zeolitic structure of the aluminosilicate is not destroyed. Another effective manner in which the alkali metal ions may be replaced is to bring the crystalline Y-type alkali metal aluminosilicate into contact with a fluid containing ammonium ions and to thereafter heat the resulting ammonium aluminosilicate to effect decomposition of the ammonium ions with liberation of $NH_3$ leaving remaining hydrogen ions in place of the original alkali metal ions. Cracking carried out with the resulting hydrogen Y-type crystalline aluminosilicate has been found to afford a high yield of useful cracked products. The results obtained have unexpectedly been found to provide an increased yield and an improved distribution of the products over comparable cracking processes wherein catalysts, prepared from other synthetic aluminosilicates, such as those of the X-type, were used.

The catalyst employed in the process of the present invention, in contrast to previous conventional cracking catalysts, is produced from a crystalline aluminosilicate of the Y-type having a structure of rigid three-dimensional networks characterized by uniform pores between 6 and 15 Angstroms in diameter and in which substantially all of the original alkali metal has been replaced with hydrogen. The uniform pore openings within the aforementioned range occur in all dimensions and permit easy access to the catalyst surface of all hydrocarbon reactant molecules and afford ready release of the product molecules.

In one embodiment, the present invention provides a process for catalytically converting organic compounds and particularly for the catalytic cracking of hydrocarbon oils in the presence of a catalyst consisting essentially of a hydrogen Y-type crystalline aluminosilicate.

In another embodiment, the present invention provides a process for catalytic cracking a hydrocarbon charge stock by bringing the same into contact under catalytic cracking conditions with a hydrogen Y-type crystalline aluminosilicate prepared by contacting an alkali metal crystalline aluminosilicate of the Y-type with a fluid medium containing ions of at least one member selected from the group consisting of those of hydrogen ammonium and combinations thereof with one another to effect replacement of at least 70 percent of the original alkali metal content of the aluminosilicate with said ions and to reduced the exchangeable alkali metal content of the resulting aluminosilicate to less than 3 percent by weight and drying and calcining the resulting product.

In still a further embodiment the present invention provides a process for the catalytic hydrocracking of a hydrocarbon charge in the presence of catalyst consisting essentially of a hydrogen Y-type crystalline aluminosilicate upon which a hydrogenation component has been deposited.

The crystalline aluminosilicates employed in preparation of the catalysts utilized in the present process are those known in the art as Y-zeolites. The latter are particularly described and may be suitably prepared in accordance with U.S. 3,130,007. The molar composition of such zeolite falls within the general formula:

$$0.9 \pm 0.2 Na_2O : Al_2O_3 : 3-6.5 SiO_2 . 9H_2O$$

The above zeolite, used in preparation of the catalyst employed in the present process, has a uniform pore structure comprising openings characterized by an effective pore diameter of between 6 and 15 Angstroms. The catalysts utilized are prepared by base exchange of the above crystalline alkali metal Y aluminosilicate with ions of at least one member selected from the group consisting of those of hydrogen, ammonium and mixtures thereof with one another to replace at least 70 and preferably more than 80 percent of the original alkali metal ions with ions of the aforementioned group, followed by washing, drying and calcining the resulting product. The exchangeable alkali metal content of the resulting catalyst is generally below 3 percent and preferably less than 2 percent by weight.

Particularly preferred, in the practice of this invention, are the catalysts prepared from those Y-zeolites having a silica to alumina mol ratio between 5 and 6.5.

The hydrogen Y-type crystalline aluminosilicate employed as catalyst in the process of this invention may be utilized in any desired physical form. Preferably, it is used in the form of small fragments of a size best suited for operation under the specified conditions existing. Thus, the catalyst may be in the form of finely divided powder or may be in the form of pellets of $\frac{1}{16}''$ to $\frac{1}{8}''$ size, for example, obtained upon pelleting, casting or extruding in accordance with the well known techniques. The use of spheroidally shaped particles is of particular advantage in hydrocarbon conversion processes in which the catalyst is subject to continuous movement, such as the compact moving bed process, the fluidized process, etc. As applied to the stationary bed, spheroidal catalyst particles provide effective contact between the reactants and catalysts by avoiding channeling.

Alternatively, the hydrogen Y crystalline aluminosilicate of this invention may be formed in composite with a porous matrix in such proportions that the resulting product contains between about 2 and 90 wt. percent, of the crystalline aluminosilicate, preferably between about 2 and 25 weight percent. The term "porous matrix" includes organic and/or inorganic compositions with which the aluminosilicate can be combined, dispersed or otherwise intimately admixed wherein the matrix may be active or inactive. It is to be understood that porosity of the compositions employed as a matrix can either be inherent in the particular material or it can be introduced by mechanical or chemical means. Representative matrices which can be employed include metals and alloys thereof, sintered metals and sintered glass, asbestor, silicon carbide aggregates, pumice, firebrick, diatomaceous earths, activated charcoal, refractory oxides, organic resins, such as polyepoxides, polyamines, polyesters, vinyl resins, phenolics, amino resins, melamines, acrylics, alkyds, epoxy resins, etc., and inorganic oxide gels. Of these matrices, the inorganic oxide gels are particularly preferred because of their superior porosity, attrition resistance, and stability under reaction conditions, especially those reaction conditions encountered in the cracking of gas oil.

The alumino-silicate-inorganic oxide gel compositions can be prepared by several methods wherein the aluminosilicate is reduced to a particle size less than 40 microns, preferably less than 10 microns, and intimately admixed with an inorganic oxide gel while the latter is in a hydrous state such as in the form of a hydrosol, hydrogel, wet gelatinous precipitate or a mixture thereof. Thus, finely divided active aluminosilicates can be mixed directly with a siliceous gel formed by hydrolyzing a basic solution of alkali metal silicate with an acid such as hydrochloric, sulfuric, etc. The mixing of the two components can be accomplished in any desired manner, such as in a ball mill or other types of kneading mills. The aluminosilicate also may be dispersed in a hydrosol obtained by reacting an alkali metal silicate with an acid or alkaline coagulant. The hydrosol is then permitted to set in mass to a hydrogel which is thereafter dried and broken into pieces of desired shape or dried by conventional spray drying techniques or dispersed through a nozzle into a bath of oil or other water-immiscible suspending medium to obtain spheroidally shaped "bead" particles of catalyst such as described in U.S. Patent 2,384,946. The aluminosilicate-siliceous gel thus obtained is washed free of soluble salts and thereafter dried and/or calcined as desired. The total alkali metal content of the resulting composite, including alkali metals which may be present in the aluminosilicate as an impurity, is less than about 3 percent and preferably less than about 2 percent by weight based on the total composition. If an inorganic oxide get matrix is employed having too high an alkali metal content, the alkali metal content can be reduced by treatment with the fluid media previously set forth either before or after drying.

In a like manner, the active aluminosilicate may be incorporated with an aluminiferous oxide. Such gels and hydrous oxides are well known in the art and may be prepared, for example, by adding ammonium hydroxide, ammonium carbonate, etc., to a salt of aluminum, such as aluminum chloride, aluminum sulfate, aluminum nitrate, etc., in an amount sufficient to form aluminum hydroxide which, upon drying, is converted to alumina. The aluminosilicate may be incorporated with the aluminiferous oxide while the latter is in the form of hydrosol, hydrogel or wet gelatinous precipitate or hydrous oxide.

The inorganic oxide gel may also consist of a semiplastic or plastic clay mineral. The aluminosilicate can be incorporated in the clay simply by blending the two and fashioning the mixture into desired shapes. Suitable clays include attapulgite, kaolin, sepiolite, polygarskite, kaolinite, plastic ball clays, bentonite, montmorillonite, illite, chlorite, etc. These clays may be chemically treated, The inorganic oxide gel may also consist of a plural gel comprising a predominant amount of silica with one or more metals or oxides thereof selected from Groups I-B, II, III, IV, V, VI, VII and VIII of the Periodic Table. Particular preference is given to plural gels of silica with metal oxides of Groups II-A, III and IV-A of the Periodic Table, especially wherein the metal oxide is magnesia, rare earth oxide, alumina, zirconia, titania, beryllia, thoria or combinations thereof. The preparation of plural gels is well known and generally involves either separate precipitation or coprecipitation techniques in which a suitable salt of the metal oxide is added to an alkali metal silicate and an acid or base, as required, is added to precipitate the corresponding oxide. The silica content of the siliceous gel matrix contemplated herein is generally within the range of 55 to 100 weight percent with the metal oxide content ranging from 0 to 45 percent. Minor amounts of promoters or other materials which may be present in the composition include cerium, chromium, cobalt, tungsten, uranium, platinum, lead, zinc, calcium, magnesium, barium, lithium, nickel and their compounds as well as silica, alumina, silica alumina, or other siliceous oxide combinations as fines in amounts ranging from 5 to 40 percent by weight based on the finished catalyst.

Other preferred matrices include powdered metals, such as aluminum, stainless steel, and powders of refractory oxides, such as $\alpha$-alumina, etc., having very low internal pore volume. These materials have substantially no inherent catalytic activity of their own.

As indicated hereinabove, crystalline alkali metal Y aluminosilicate undergoes base exchange with ions of at least one member selected from the group consisting of these of hydrogen, ammonium, organic nitrogen ions, and mixtures thereof with one another. Base exchange is carried out to replace at least 70 and preferably more than 80 percent of the original alkali metal ions with ions of the above-mentioned group, and to reduce the exchangeable alkali metal content of the finished catalyst to below 3 and preferably below 2 weight percent. Base exchange is desirably effected by treatment with a solution containing hydrogen, ammonium ions, or organic nitrogen ions such as quaternary ammonium ions, guanidine salts and amine salts. When an acid solution is employed for base exchange, it will be understood that the concentration thereof is below that which would adversely effect the structure of the crystalline aluminosilicate. Generally, it is preferred to employ an ammonium compound as the base exchange solution, thereby replacing the alkali metal ions of the crystalline aluminosilicate initially with ammonium ions. The latter, upon drying and calcining of the aluminosilicate, undergo decomposition with the liberation of ammonia to leave residual hydrogen ions. Generally, an aqueous solution of an acid or an ammonium compound will be employed for effecting the desired base exchange. The base exchange solution may be contacted with the crystalline aluminosilicate in the form of a fine powder, a compressed pellet, extruded pellet, or other suitable particle shape. It has been found that the desired base exchange may be effected most readily if the alkali metal aluminosilicate undergoing treatment has not been previously subjected to a temperature above about 600° F.

The temperature at which base exchange is effected may vary widely, generally ranging from room temperature to an elevated temperature below the boiling point of the treating solution. While the volume of the base exchange solution employed may vary widely, generally an excess is employed and such excess is removed from contact with the crystalline aluminosilicate after a suitable period of contact. The time of contact between the base exchange solution and crystalline aluminosilicate, in any instance in successive contacts, is such as to effect replacement of the alkali metal ions thereof to an extent such that the exchangeable alkali metal content of the finished catalyst is less than 3 percent by weight. It will be appreciated that such period of contact may vary widely, depending on the temperature of the solution and the particular compound employed for base exchange. Thus, the time of contact may extend from a brief period of the order of a few hours for small particles to longer periods of the order of days for large pellets.

After base exchange treatment, the product is removed from the treating solution. Anions introduced as a result of treating with the base exchange solution may, if desired or necessary, be removed by washing the treated composite for such period of time until the same is free of said anions. The washed product is then dried generally in air to remove substantially all of the water therefrom. While drying may be effected at ambient temperature, it is more satisfactory to facilitate the removal of moisture by maintaining the product at a temperature between about 150 and about 600° F. for 4–48 hours. The dried material can then be subjected to calcination by heating in an inert atmosphere, i.e. one which does not adversely affect the catalyst such as air, nitrogen, hydrogen, flue gas or other inert gas. Generally, the dried material is heated in air to a temperature in the approximate range of 500° F. to 1500° F. for a period of at least about 1 hour and usually between 1 and 48 hours.

It has been found that catalyst selectivity of the above described composition is greatly improved by subjecting the same to a mild steam treatment. Exposure of the catalyst to steam is a highly desirable step in obtaining a product capable of affording an enhanced yield of gasoline. Steam treatment may be carried out at a temperature within the approximate range of 400 to 1450° F. for at least about 2 hours. Usually steam at a temperature of about 1000° F. to 1400° F. will be used with the treating period extending from about 2 to about 100 hours.

Also, an atmosphere consisting of a substantial amount of steam, say at least about 5 percent by volume, but containing air or other gas substantially inert with respect to the composite being treated may be used and such mixtures may, in some instances, be desirable with the use of the more elevated temperatures to avoid possible deactivation of the catalyst. The steam treatment may be effected at pressures from atmospheric up to about 500 p.s.i.g.

According to another embodiment of this invention, it has been found that the deposition of between about 0.1 and 25 wt. percent of a hydrogenation component onto the steamed hydrogen Y crystalline aluminosilicate, produced in the manner of the invention, results in a catalyst having unusual activity and selectivity in the hydrocracking of petroleum hydrocarbons. This novel hydrocracking catalyst comprises a hydrogenation component and, particularly one selected from the group consisting of oxides of metals, sulfides of metals, and metals of Groups VI and VIII of the Periodic Table, in intimate combination with the steamed hydrogen Y crystalline aluminosilicate produced as above described.

In the present conversion processes, the catalyst may be used as pellets in a fixed bed operation or they may be used in a compact moving bed operation or in a fluidized operation. The general operating conditions cover a wide range. However, it is generally desirable to carry out such processes at a temperature within the approximate range of 500 to 1200° F. and a pressure ranging from subatmospheric up to several hundred atmospheres. The contact time of the oil with the catalyst is achieved in any case according to the conditions, the particular oil feed and the particular results desired to give a substantial amount of conversion to lower boiling products.

The cracking activity of the catalyst is a measure of its capacity to catalyze various conversions of hydrocarbons and is expressed herein as the percentage conversion of a Mid-Continent Gas oil having a boiling range of 450 to 950° F. to gasoline having an end boiling point of 410° F. by passing vapors of the said gas oil through the catalyst at about 900° F., substantially atmospheric pressure and a feed rate of 4 to 10 volumes of liquid oil per volume of catalyst per hour for 10 minute runs between regenerations.

It has been found desirable in analyzing the results obtained with the catalysts described herein to compare the same with those realized with a conventional commercial silica-alumina gel cracking catalyst containing approximately 10 weight percent alumina. The exceptional activity, stability, and selectivity of the present catalyst is emphasized by comparison of the various product yields obtained with such catalyst with yields of the same products given by the conventional silica-alumina catalyst at the same conversion level. The differences (Δ values) shown hereinafter represent the yields given by the present catalyst minus the yields given by the conventional catalyst.

The following examples will serve to illustrate the invention described hereinabove without limiting the same.

EXAMPLE 1

Crystalline sodium aluminosilicate of the Y-type was prepared from the following reactants:

A. Silica solution 1551 cc. (1870 grams) of colloidal silica containing 0.361 gram $SiO_2$/cc.

B. Sodium aluminate solution $NaAlO_2$ (41.7% wt. $Al_2O_3$, 30% wt. $Na_2O$)
grams__ 75
NaOH (77.5% wt. $H_2O$) _____do____ 330
$H_2O$ _____cc__ 1345

The above solutions were mixed at a temperature of about 80° F. by pouring solution B into solution A. The resulting mixture was agitated vigorously for approximately one-half hour. The slurry, so obtained, was then heat treated at a temperature of about 200° F. for 42 hours. The solid material present was thereafter separated from the supernatant liquid by filtration. The filter cake obtained was washed with one volume of water per volume of initial slurry to remove the free caustic.

Two hundred (200) grams of the Y-zeolite, prepared as described above, were base exchanged with a 5 weight percent aqueous solution of ammonium chloride. Base exchange was carried out at 180° F. using 12 contacts of 2 hours each with ½ volume of solution per volume of slurry. The exchanged material was washed free of soluble anions, dried for 24 hours in air at 270° F., tempered in air for 10 hours at 1000° F. and treated with steam at atmospheric pressure for 20 hours at 1225° F.

The composition so obtained had a sodium content of 1.19 weight percent, and a surface area of 66 m.$^2$/gram.

EXAMPLE 2

Crystalline sodium aluminosilicate of the X-type was prepared by admixture of the following solutions:

A. Sodium silicate solution

Water _____lbs.__ 28.6
Sodium hydroxide (97.6% NaOH) _____lbs__ 2.2
Sodium silicate (28.8% $SiO_2$, 9.1% $Na_2O$ and 62.1% $H_2O$) _____lbs__ 15.5
Specific gravity at 105° F. _____ 1.164

B. Sodium aluminate solution

Water _____lbs__ 39.0
Sodium hydroxide (97.6% NaOH) _____lbs__ 2.2
Sodium aluminate (43.5% $Al_2O_3$, 30.2% $Na_2O$ and 22.6% ignition loss) _____lbs__ 5.12
Specific gravity at 111° F. _____ 1.128

Solution A was added rapidly to Solution B with vigorous agitation, which was continued for 15 minutes after addition was complete to give a homogeneous slurry. The resulting slurry was charged to glass battery jars for processing. The jars were placed in a hot water bath at 200–205° F. for a period of about 20 hours. The slurry was then filtered and water-washed using ⅓ volume of water per original volume of slurry.

A one-pound portion of the resulting filter cake (55% weight solid at 235° F.) was base exchanged twenty-six times with fresh 10 percent aqueous ammonium chloride solution at a temperature of 180° F., using 700 cc. of solution for each contact. Seventeen of the contacts were for 2-hour periods and nine were for periods of 16 hours.

The base exchange material was then washed free of chloride ion, dried at 230° F., pelleted to particles of ½ x ⅛", tempered for 10 hours at 1000° F. in air and thereafter stabilized by steam treating for 20 hours at 1225° F. with 100 percent atmospheric steam. Analysis of the product so obtained showed a sodium content of 0.66 weight percent. Catalytic cracking in the manner described hereinabove was carried out using the compositions of Examples 1 and 2 as catalysts and the results obtained are shown in Table I below:

TABLE I

| | Example No. | |
|---|---|---|
| | 1 | 2 |
| Description: Type | [1] 13Y | [1] 13X |
| Base Exchange: | | |
| Solution | $NH_4Cl$ | $NH_4Cl$ |
| Conc., wt. percent | 5 | 10 |
| Sodium Content: Na, wt. percent | 1.19 | 0.66 |
| Physical Properties: | | |
| App. Dens., g./cc | 0.66 | |
| Surface Area, m.²/g., Steamed | 66 | |
| Catalytic Evaluation: | | |
| Conversion, vol. percent | 53.2 | 32.6 |
| LHSV | 10 | 10 |
| 10 RVP Gaso., vol. percent | 47.2 | 32.6 |
| Excess $C_4$'s, vol. percent | 9.3 | 4.2 |
| $C_5$+Gasoline, vol. percent | 44.7 | 28.6 |
| Total $C_4$'s, vol. percent | 11.8 | 6.1 |
| Dry Gas, wt. percent | 5.2 | 3.4 |
| Coke, wt. percent | 0.99 | 0.9 |
| Advantage Over Standard Cracking Catalyst:[2] | | |
| 10 RVP, vol. percent | +5.9 | |
| Excess $C_4$'s, vol. percent | −2.2 | |
| $C_5$+Gasoline, vol. percent | +5.7 | |
| Total $C_4$'s, vol. percent | −2.0 | |
| Dry Gas, wt. percent | −1.3 | |
| Coke, wt. percent | −2.4 | |

[1] Na Aluminosilicate.
[2] Commercial silica-alumina cogel catalyst containing approximately 90% $SiO_2$ and 10% $Al_2O_3$.

As will be seen from the above data, cracking with the catalyst utilized in the present process and consisting essentially of a hydrogen Y-type aluminosilicate, afforded very marked advantages and improvements over cracking with the catalyst of Example 2, consisting of a hydrogen X-type aluminosilicate.

The following examples will serve to illustrate two features of this invention:

(1) The incorporation of the hydrogen Y crystalline aluminosilicate into a porous matrix, and (2) The catalytic advantages of employing a Y faujasite type having a mol ratio of silica to alumina greater than 5 over a catalyst prepared in a similar manner but containing a crystalline aluminosilicate of the Y faujasite type having a mol ratio of silica to alumina of less than 5.

Preparational details are covered in the following discussion.

EXAMPLE 3

This catalyst was prepared by mixing together a sodium silicate solution having dispersed therein a crystalline NaY aluminosilicate having a silica/alumina molar ratio of 4.6 with an acid aluminum sulfate solution. The quantity of dispersed NaY was that necessary to give 10% of the final catalytic product. The solutions were prepared mixing the following components:

Solution A.—Silicate solution

Solution 1:
   N. brand silicate (28.9 wt. percent $SiO_2$, 8.9 wt. percent $Na_2O$, 62.2 wt. percent water) _____lbs__ 15.68
   Water _____lbs__ 7.92
   Kaolin clay (87 wt. percent solids) __lbs__ 1.11
Solution 2:
   Sodium Y crystalline aluminosilicate __lbs__ 1.23
   Solids (determined at 1000° F.) wt. percent__ 51.9
   Water _____lbs__ 7.18

Solution B.—Acid-aluminum sulfate solution

Water _____lbs__ 57.10
$Al_2(SO_4)_3 \cdot 18H_2O$ _____lbs__ 4.23
$H_2SO_4$ (97%) _____lbs__ 1.98

This solution had a sp. gr. of 1.055 at 80° F.

In the bead forming operation these two solutions were mixed together through a mixing nozzle. The silicate solution (A) at 84° F. and flowing at a rate of 446 ml. per minute was mixed with 448 ml. acid (B) solution at 40° F. forming a hydrosol having a pH of 8.3 and a gel time of 2.1 seconds. This hydrosol was formed into bead hydrogel in the conventional bead forming method.

The resulting bead hydrogel formed as described above was then base exchanged with a continuous flow of 1 wt. percent $NH_4Cl$ solution over a 24 hour period, using ½ volume of solution/hr./volume of beads. Following the base exchange the hydrogel was washed free of chloride ion, dried for 20 hours at 275° F., calcined for 10 hours at 1000° F. in air and finally steamed for 24 hours at 1200° F. with steam at 15 p.s.i.g.

The final catalyst containing 10 wt. percent ammonium exchanged crystalline Y aluminosilicate analyzed 0.3 wt. percent Na and had a surface area of 108 m.²/g.

EXAMPLE 4

This example was prepared by the procedure according to Example 3 with the exception that the sodium Y crystalline aluminosilicate had a molar ratio of silica to alumina of 5.1.

The final catalyst containing 10 wt. percent ammonium exchanged crystalline Y aluminosilicate analyzed 0.2 wt. percent Na and had a surface area of 134 m.²/g.

TABLE II.—10 WT. PERCENT ACID Y BEAD-TYPE CATALYSTS

| | Example No. | |
|---|---|---|
| | 3 | 4 |
| Steaming | [1] PSR 24 | [1] PSR 24 |
| Description of Catalyst: | | |
| Matrix | $SiO_2/Al_2O_3$(94/6) | |
| Added Faujasite: | | |
| Type | NaY | NaY |
| $SiO_2/Al_2O_3$, mole/mole | 4.6 | 5.1 |
| Added Fines: | | |
| Type | McNamee | Clay |
| Conc., wt. percent | 15 | 15 |
| Base Exchange: | | |
| Solution | 1.0 wt.% $NH_4Cl$ | |
| Contacts, Continuous at R.T | 1–24 Hr. | |
| Catalyst Properties: | | |
| Na, wt. percent | 0.3 | 0.2 |
| Surface Area, m.²/g | 108 | 134 |
| Catalyst Evaluation: | | |
| LHSV, hr.⁻¹ | 4 | 4 |
| C/O, vol./vol | 1.5 | 1.5 |
| Conversion, vol. percent | 41.7 | 60.0 |
| $C_5$+Gasoline, vol. percent | 34.7 | 49.3 |
| Total $C_4$'s, vol. percent | 9.5 | 13.9 |
| Dry Gas, wt. percent | 4.3 | 5.7 |
| Coke, wt. percent | 1.1 | 1.6 |
| $H_2$, wt. percent | 0.04 | 0.04 |
| Delta Advantage Over Si/Al: | | |
| $C_5$+ Gasoline, vol. percent | +2.9 | +6.8 |
| Total $C_4$'s, vol. percent | −0.4 | −2.3 |
| Dry Gas, wt. percent | −0.9 | −2.1 |
| Coke, wt. percent | −1.1 | −2.8 |

[1] Steamed for 24 hours at 1200° F. with steam at 15 p.s.i.g.

The comparative catalytic data summarized in Table II show the particular catalytic advantages of Example 4 which contained 10% acid Y aluminosilicate having a $SiO_2/Al_2O_3$ mole ratio of 5.1. Not only are the advantages in activity obtained but also advantages in selectivity are significant in high $C_5$+ gasoline yield with low dry gas and coke production.

The next example describes the preparation of a hydrocracking acid Y crystalline aluminosilicate catalyst.

EXAMPLE 5

A catalyst of the steamed acid Y crystalline aluminosilicate type was prepared by first base exchanging a sodium Y crystalline aluminosilicate, having a 5.6 mol ratio of silica to alumina, with an ammonium chloride solution to a low residual sodium. The exchanged crystalline aluminosilicate was then dried at 230° F., calcined at 1000° F. and then steamed for 24 hours at 1200° F. with steam at 15 p.s.i.g. The resulting steamed crystalline Y aluminosilicate was then impregnated with a solution of chloroplatinic acid to which was added 2 moles NaOH per mol Pt. The impregnated catalyst was then aged for 20 hours at 230° F. in a non-drying atmosphere followed by activation in a flowing stream of hydrogen.

Preparational details involved, first preparing the crystalline sodium Y aluminosilicate by mixing the following components:

A. Sodium aluminate solution

Sodium aluminate (43.4 wt. percent $Al_2O_3$; 30.5 wt. percent $Na_2O$) _____ g__ 300
NaOH (77.5 wt. percent $Na_2O$) _____ g__ 178
$H_2O$ _____ g__ 944

B. Silica source

Du Pont Colloidal silica sol (Ludox L.S. 30% wt. $SiO_2$) _____ cc__ 2040

These solutions were mixed together for 30 minutes, then aged for 21 hours at room temperature, and then aged at 190–200° F. for a 9 day period until the desired crystalline Y aluminosilicate formed. This crystalline Y aluminosilicate was subsequently water washed free of excess alkali. The composition of this crystalline aluminosilicate was: Na 8.6 wt. percent, $Al_2O_3$ 20.4 wt. percent, $SiO_2$ 67.2 wt. percent having a molar ratio of silica to alumina of 5.6.

To prepare the steamed acid form, this sodium form was, first base exchanged continuously with a 5 wt. percent $NH_4Cl$ solution at 180° F. over a 12 day period charging 360 lbs. of solution per 4 lbs. of hydrous sodium Y crystalline aluminosilicate. Following this base exchange the aluminosilicate was washed free of chloride ion, dried 20 hours at 230° F., pelleted and sized 14 x 25 mesh, calcined 10 hours at 1000° F. and finally steamed for 24 hours at 1200° F. with steam at 15 p.s.i.g.

The final steamed acid Y crystalline aluminosilicate analyzed Na 1.0 wt. percent, $Al_2O_3$ 20.8 wt. percent, $SiO_2$ 78.5 wt. percent.

In preparing the hydrocracking catalyst containing the Pt, 133.9 g. of the steamed acid Y crystalline aluminosilicate was impregnated under vacuum with 110 ml. of solution of $H_2PtCl_6$ plus NaOH (3.7 ml. of $H_2PtCl_6$ (3.43 g. Pt) plus 1.438 g. NaOH (2Na/Pt)+$H_2O$). This impregnated catalyst was then aged in a non-drying atmosphere at 230° F. for 20 hours followed by activation in a flowing stream of hydrogen gas for 2 hours at 450° F. and 950° F.

The final catalyst analyzed 2.6 wt. percent Pt, and 1.5 wt. percent Na. The surface area was 330 m.²/g. From the surface area data and adsorption data (10.8 wt. percent cyclohexane adsorption) and also from the X-ray data it was apparent that this catalyst was substantially crystalline aluminosilicate.

This catalyst exhibits extremely good properties in hydrocracking a Mid-Continent gas oil at temperature in the range of 500° to 900° F., pressures between 300 and 3000 p.s.i.g., at $H_2$/hydrocarbon ratios of 2/1 to 20/1 and at catalyst/oil ratios of 0.5 to 5. The $C_5+$ liquid yields are very high and the yields of dry gas are very low.

What is claimed is:

1. A method for converting a hydrocarbon charge which comprises contacting the same under conversion conditions with a hydrogen crystalline aluminosilicate, characterized by a silica to alumina mol ratio greater than 3, treated with steam at a temperature within the approximate range of 400 to 1450° F. for at least about 2 hours.

2. A method according to claim 1 wherein said silica to alumina mol ratio is between about 5 and 6.5.

3. A method for cracking a hydrocarbon charge which comprises contacting the same under catalytic cracking conditions with a hydrogen crystalline aluminosilicate characterized by a mol ratio of silica to alumina greater than 3, treated with steam at a temperature within the approximate range of 400 to 1450° F. for at least about 2 hours.

4. A method for cracking a hydrocarbon charge which comprises contacting the same under catalytic cracking conditions with a hydrogen crystalline aluminosilicate characterized by a silica to alumina mol ratio of 3 to 6.5, treated with steam at a temperature within the approximate range of 400 to 1450° F. for at least about 2 hours.

5. A method for cracking a hydrocarbon charge which comprises contacting the same under catalytic cracking conditions with the catalytic composition resulting from base exchange of an alkali metal Y crystalline aluminosilicate with ions selected from the group consisting of those of hydrogen, ammonium, organic nitrogen ions and mixtures thereof with one another to effect replacement of at least 70 percent of the original alkali metal content of said aluminosilicate with said ions and to reduce the exchangeable alkali metal content of the resulting aluminosilicate to less than 3 percent by weight, drying and treating with steam at a temperature within the approximate range of 400 to 1450° F. for at least about 2 hours.

6. A process for cracking a hydrocarbon charge which comprises contacting the same under catalytic cracking conditions with a hydrogen Y crystalline aluminosilicate, treated with steam at a temperature of 400 to 1450° F. for at least about 2 hours.

7. A method for cracking a hydrocarbon charge which comprises contacting the same under catalytic cracking conditions with the catalytic composition resulting from base exchange of an alkali metal Y crystalline aluminosilicate with ions selected from the group consisting of those of hydrogen, ammonium, organic nitrogen ions and mixtures thereof with one another to effect replacement of at least 70 percent of the original alkali metal content of said aluminosilicate with said ions and to reduce the exchangeable alkali metal content of the resulting aluminosilicate to less than 3 percent by weight and drying and contacting with steam at a temperature within the approximate range of 400 to 1450° F. for at least about 2 hours.

8. A method for cracking a hydrocarbon charge which comprises contacting the same under catalytic cracking conditions with the catalytic composition resulting from base exchange of an alkali metal Y crystalline aluminosilicate with ions selected from the group consisting of those of hydrogen, ammonium, organic nitrogen ions and mixtures thereof with one another to effect replacement of at least 80 percent of the original alkali metal content of said aluminosilicate with said ions and to reduce the exchangeable alkali metal content of the resulting aluminosilicate to less than 2 percent by weight and drying and contacting with steam at a temperature within the approximate range of 400 to 1450° F. for at least about 2 hours.

9. A method according to claim 1 wherein said crystalline aluminosilicate is admixed with a porous matrix.

10. A method according to claim 9 wherein said converting comprises cracking said hydrocarbon charge.

11. A method according to claim 1 wherein said converting comprises hydrocracking said charge by contacting the same in the presence of hydrogen under hydrocracking conditions, wherein said crystalline aluminosilicate, further characterized by a silica to alumina mol ratio greater than 5, has impregnated thereon a minor proportion of a hydrogenation component selected from the group consisting of oxides of metal, sulfides of metals and metals of Groups VI, VIII and mixtures of Groups VI and VIII of the Periodic Table.

12. A method according to claim 11 wherein said crystalline aluminosilicate is characterized by a silica to alumina mol ratio between about 5 and 6.5 and said hydrogenation component comprises between about 0.1 and about 25 percent by weight.

13. A method according to claim 2 wherein said crystalline aluminosilicate is admixed with a porous matrix.

References Cited

UNITED STATES PATENTS

| | | | |
|---|---|---|---|
| 2,962,435 | 11/1960 | Fleck et al. | 208—119 |
| 2,982,719 | 5/1961 | Gilbert et al. | 208—120 |
| 3,130,007 | 4/1964 | Breck | 23—113 |
| 3,236,761 | 2/1966 | Rabo et al. | 208—111 |
| 3,257,310 | 6/1966 | Plank et al. | 208—120 |

ABRAHAM RIMENS, *Primary Examiner.*

DELBERT E. GANTZ, *Examiner.*

Disclaimer 3,391,075.—*Charles J. Plank*, Woodbury, and *Edward J. Rosinski*, Almonesson, N.J. CATALYTIC CONVERSION OF HYDROCARBONS WITH THE USE OF A STEAM TREATED Y TYPE OF CRYSTALLINE ALUMINO SILICATE. Patent dated July 2, 1968. Disclaimer filed Nov. 20, 1968, by the assignee, *Mobil Oil Corporation*.

Hereby disclaims the terminal portion of the term of the patent subsequent to July 7, 1981.

[*Official Gazette April 1, 1969.*]